March 27, 1945.  O. A. JOHNSON  2,372,279
CUTTER TESTING DEVICE
Filed April 27, 1943   4 Sheets-Sheet 3
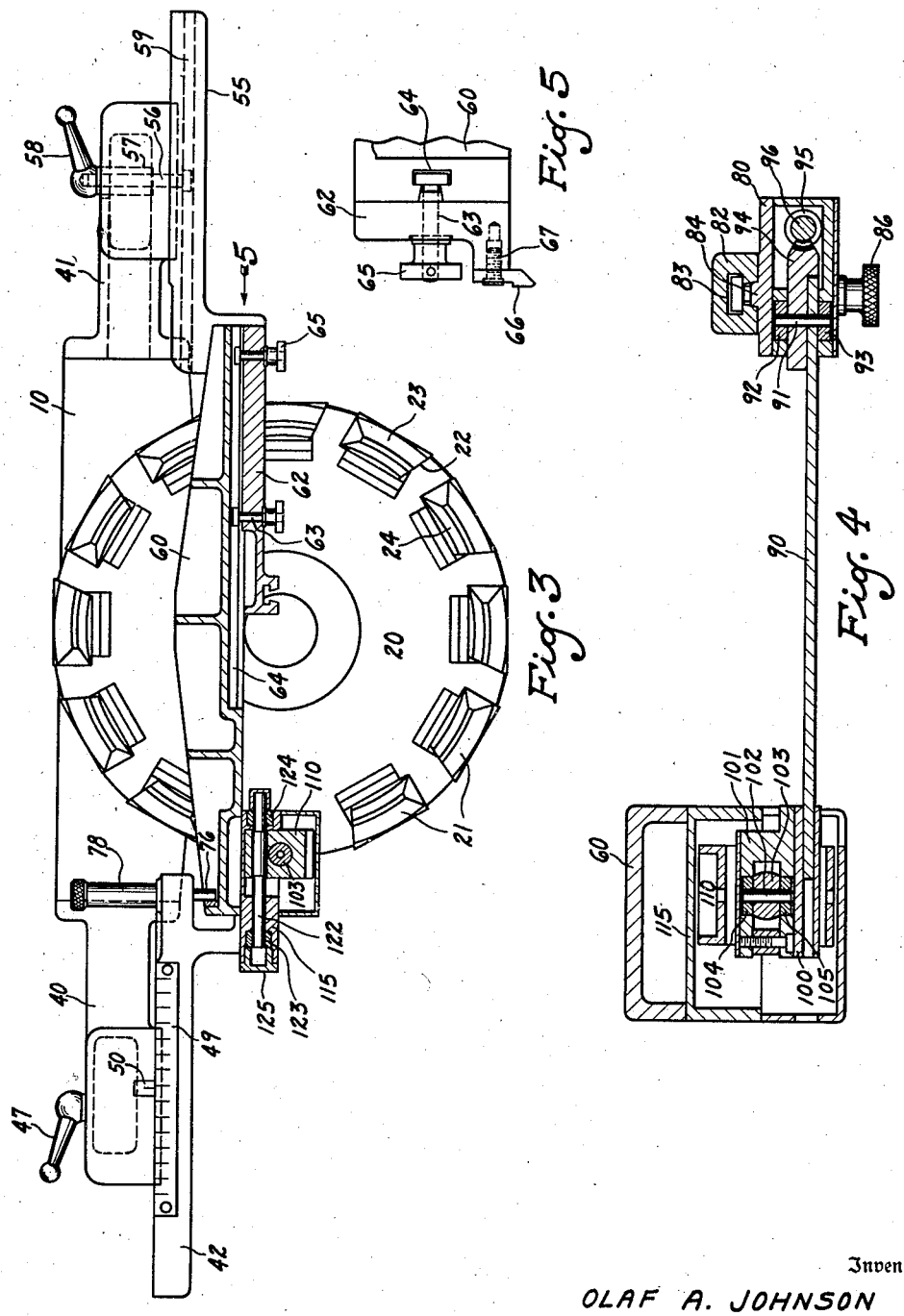
Inventor
OLAF A. JOHNSON

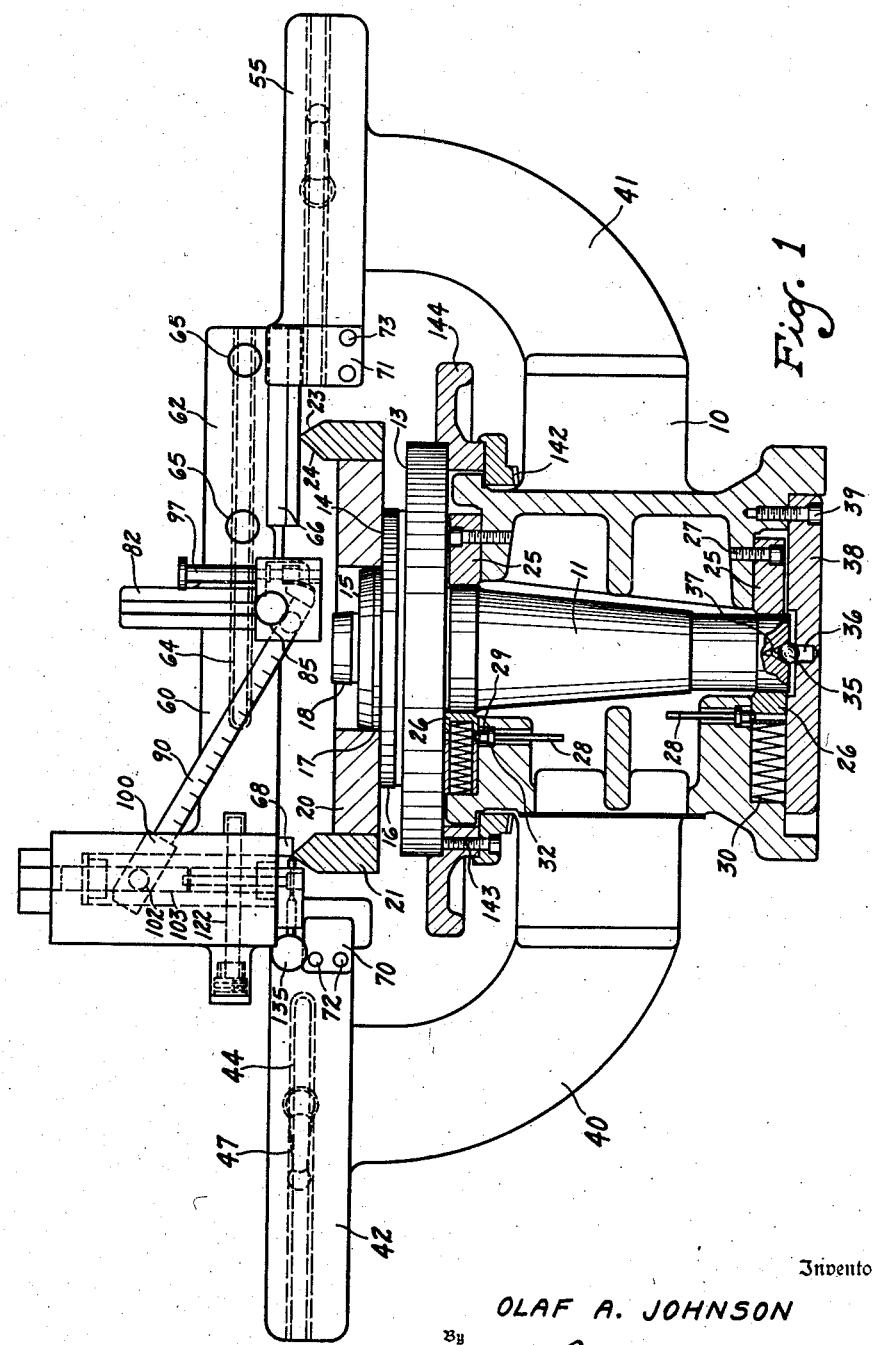

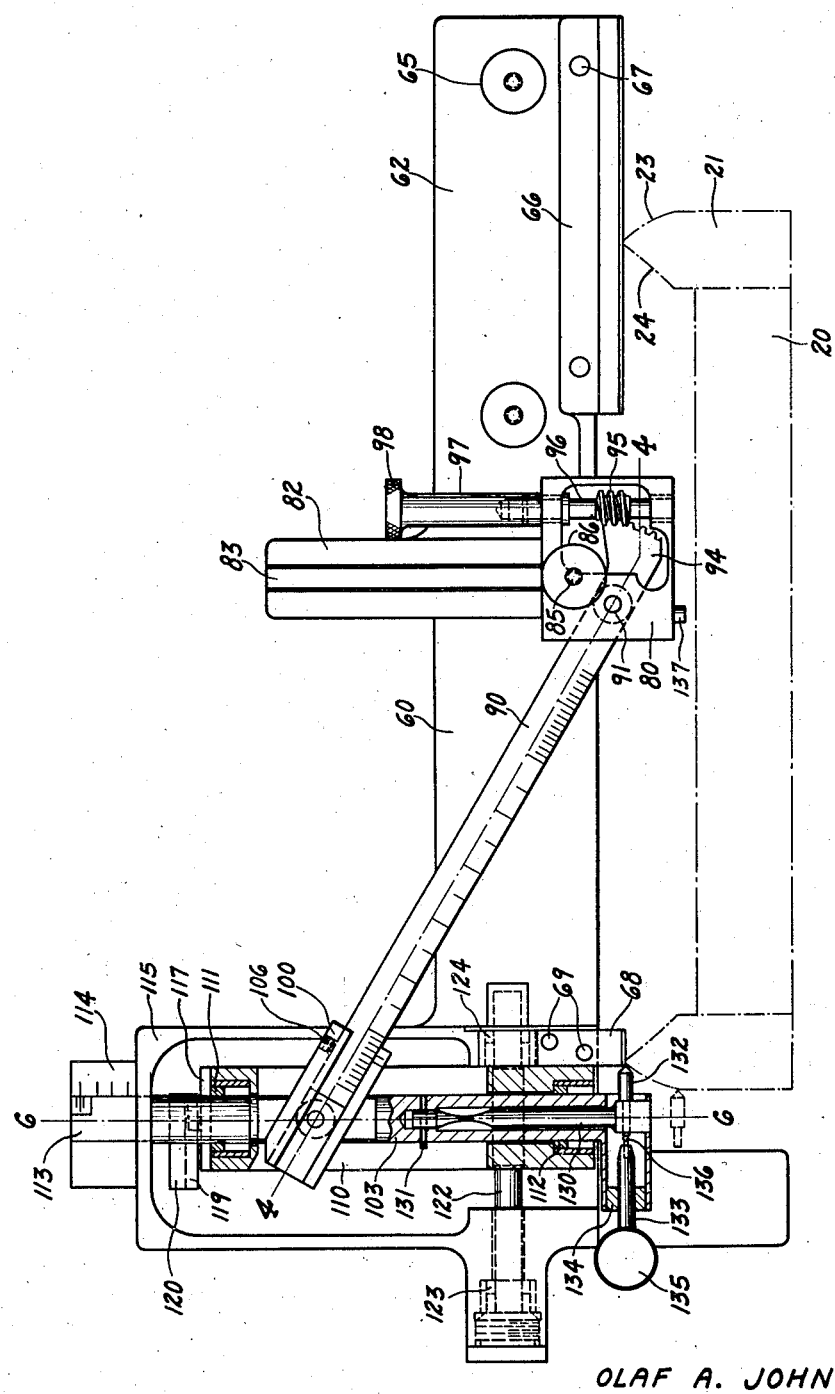

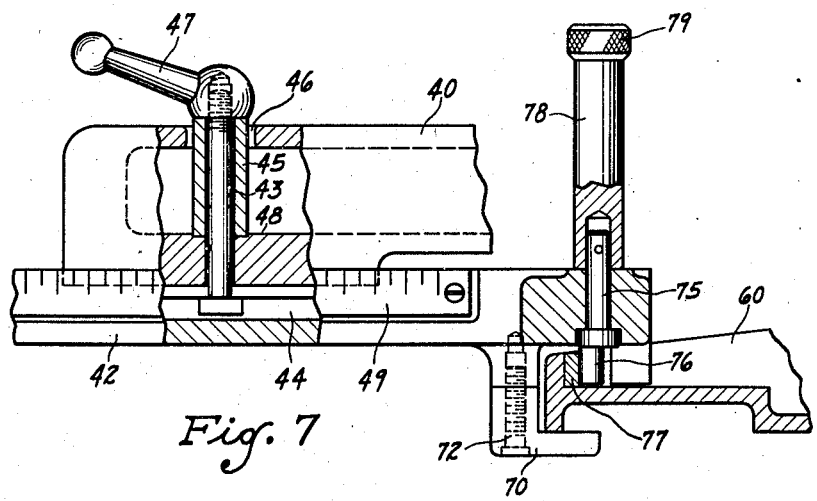
Fig. 7
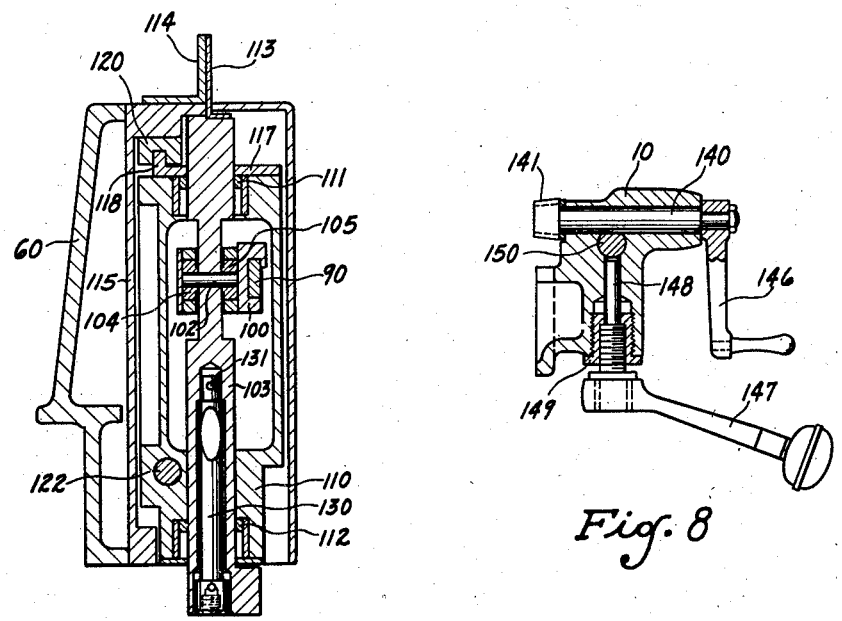
Fig. 6
Fig. 8

Patented Mar. 27, 1945

2,372,279

UNITED STATES PATENT OFFICE 2,372,279

CUTTER TESTING DEVICE

Olaf A. Johnson, Irondequoit, N. Y., assignor to Gleason Works, Rochester, N. Y., a corporation of New York Application April 27, 1943, Serial No. 484,721

7 Claims. (Cl. 33—179.5)

The present invention relates to testing apparatus and particularly to apparatus for testing face mill gear cutters whose blades are of curved profile shape.

Face-mill gear cutters have a plurality of cutting blades, and to cut accurate gears each of the blades must be at the required radial distance from the cutter axis and must have the required inclination to the cutter axis. Face-mill gear cutters with blades of curved profile shape have been known for many years but it has been only a relatively short time that they have come into any extensive use. Until quite recently it has been the general practice to use face-mill cutters having blades of straight profile shape for cutting spiral bevel, hypoid, and other longitudinally curved tooth gears. Apparatus for testing the radial positions and pressure angles of face-mill gear cutter blades of straight profile have long been manufactured and have long been in general use where such cutters are employed. However, such testing devices are not practical for testing face mill gear cutters whose blades are of curved profile shape.

The primary object of the present invention is to provide a simple and efficient device for testing the profile curvatures of blades of a face-mill gear cutter whose cutting edges are of curved profile shape.

A further object of the invention is to provide a device that may not only be employed for testing the profile curvatures but also the radial positions of the blades of a face-mill cutter whose blades are of curved profile shape.

Another object of the invention is to provide a device of the character described which may be employed in addition for testing the pressure angles or inclinations to the cutter axis of the face-mill gear cutter blades of curved profile shape.

Other objects of the invention will be apparent hereinafter from the specification and from the recital of the appended claims.

In the drawings:

Fig. 1 is a vertical sectional view of a cutter testing device constructed according to one embodiment of this invention, and showing the same in use for testing the outside blades of a face-mill gear cutter whose outside cutting edges are of curved profile shape;

Fig. 2 is a view on an enlarged scale of certain of the parts shown in Fig. 1, some of them being broken away and shown in section in order to illustrate more clearly the construction and operation of the testing device;

Fig. 3 is a view partly in plan and partly in section of the apparatus shown in Fig. 1;

Fig. 4 is a sectional view on the line 4—4 of Fig. 2;

Fig. 5 is a fragmentary end view looking in the direction of the arrow 5 of Fig. 3;

Fig. 6 is a section on the line 6—6 of Fig. 2;

Fig. 7 is a fragmentary enlarged view, with parts broken away, showing the means for clamping the gage bar at one end to the supporting stand, and for adjusting the radial position of the gage bar on the supporting stand; and Fig. 8 is a fragmentary sectional view showing the means for rotating the cutter on the supporting stand to bring successive blades into testing position.

The testing device illustrated in the drawings is shown arranged for testing a cutter having all outside cutting blades of curved profile shape. It comprises a stand in which is journalled a spindle to which the cutter, that is to be tested, is secured. The testing mechanism proper is carried by a gage bar which is removably mounted on the stand and which extends approximately diametrically across the cutter to be tested, resting upon the tops of diametrically opposite blades of the cutter. The testing mechanism proper includes a dial gage and a contact member, the latter being mounted for movement in a circular arcuate path along the profile of a blade to be tested from top to bottom thereof. The contact member is carried by a flexible strap which is secured in a rod that is movable axially of the cutter and that is carried by a slide which is movable on the gage bar in a direction at right angles to the cutter axis. These two rectilinear movements of rod and slide resolve themselves into the desired circular arcuate movement of the contact member. For moving the slide and rod, there is an arm pivotally connected at one end to the rod and pivotally mounted at its other end on the gage bar. This arm is manually movable about its pivot. The length of this arm is adjustable to determine the radius of the path of movement of the contact member. Thus the contact member may be moved in a controlled curved path from top to bottom of the blade being tested. If the curvature of the blade is incorrect or if the side surface of the blade being tested is incorrectly inclined to the axis of the cutter, the contact member, through its operative connection with the dial gage, will register the inaccuracy. By testing successive blades at the same distance down from their tops, the relative radial positions of the blades can also be tested.

Referring now to the drawings by numerals of reference, 10 indicates the base of the cutter truing device, and 11 a spindle, which is journaled in the base and which is adapted to carry the cutter that is to be tested. The upper end of the spindle is formed with an enlarged head which is preferably formed, as shown in Fig. 1, with three seats 13, 14, and 15 and with three centering portions 16, 17, and 18, respectively, which cooperate with the seats to permit mounting of face mill cutters of three different standard sizes on the spindle 11. In Fig. 1, an intermediate size of cutter is shown mounted on the seat portion 14 of the spindle and centered by the centering portion 17.

The cutter comprises the cutter head 20 and a plurality of cutting blades 21 which are secured in slots provided in the cutter head and whose cutting portions project beyond one side face of the cutter head in the general direction of the axis of the cutter. In the cutter shown in the drawings, the blades are all outside cutting blades, each blade having its front face 22 sharpened at an acute angle to its outside surface 23 to provide an outside cutting edge. The outside surfaces 23 of the blades are inclined to the axis of the cutter and are of circular arcuate profile shape. Hence the outside cutting edges of the blades are also of positive inclination to the axis of the cutter and of circular arcuate profile shape. In the cutter shown, the inside surfaces 24 of the cutting portions of the blades are also inclined to the axis of the cutter and of circular arcuate profile shape, but since these are non-cutting sides of the blades, it is not necessary to gage or test them. The cutter can be secured to the spindle 11 for testing by bolts (not shown) which thread into the seat 14 of the spindle.

The spindle 11 is journaled in the base 10 on a center, which engages the lower end of the spindle, and on a pair of three-point bearings, which engage the spindle at spaced points along its length. The three-point bearings are of a conventional type and each comprises a fixed part 25 and a movable part 26. The fixed parts 25 are secured to the base 10 by screws 27. The adjustable parts 26 may be retracted from operative position for mounting of the spindle 11 in the base 10 or removal therefrom. For this purpose pins 28 are provided. These pins have collars 32 of generally spherical shape which seat in cylindrical holes formed in the base 10. The pins are provided with portions 29 which engage in recesses in the bearing parts 26 and are intended to be rocked on their spherical collars 32 to move the parts 26 from operative position. Coil springs 30 serve to maintain the bearing parts 26 in engagement with the spindle under pressure when the test device is in use.

The lower end of the spindle 11 is centered on a ball 35. This is mounted in a hardened block 36 and seats in a recess 37 formed in the lower end of the spindle. The block 36 is secured in a plate 38. The plate 38 is mounted in a recess formed in the base 10 and is secured to the base 10 by screws 39.

There are two arms 40 and 41 secured to the base 10 at opposite sides thereof. Mounted on the arm 40 for rectilinear adjustment thereon in a plane perpendicular to the axis of the spindle 11 is a supporting bar 42. The supporting bar 42 is adapted to be secured to the arm 40 in any adjusted position by means of a T-bolt 43 (Fig. 7) whose head engages in a T-slot 44 formed in the rear face of the bar 42. A sleeve 45 surrounds the T-bolt 43 and the two extend through an opening 46 in the rear face of the arm 40. A clamping handle 47 is threaded on the T-bolt at the rear end thereof, and by manipulating this handle, the T-bolt may be pulled rearwardly and the sleeve 45 may be forced forwardly against the face 48 of the hollow arm 40 to clamp the supporting bar 42 to the arm 40. There is a graduated scale 49 secured to the supporting bar 42, and this scale reads against a reference pointer 50 (Fig. 3) that is secured to the arm 40, to permit adjusting the position of the bar 42 on the arm 40 precisely.

There is a supporting bar 55 mounted on the arm 41 for adjustment rectilinearly thereon toward and from the supporting bar 42. The supporting bar 55 is secured to the arm 41 in any adjusted position by a clamping means similar to that employed for clamping the bar 42 to the arm 40. This clamping means comprises the T-bolt 56, sleeve 57 and clamping handle 58 (Fig. 3). The head of the T-bolt 56 engages in a T-slot 59 formed in the rear face of the bar 55.

Between them, the supporting bars 42 and 55 carry a gage bar 60. Adjustably mounted on the gage bar 60 is a plate 62. This plate is rectilinearly adjustable on the gage bar 60 and is adapted to be secured in any adjusted position on the bar by T-bolts 63 (Figs. 3 and 5) whose heads engage in the T-slot 64 formed in the front face of the gage bar 60. These T-bolts 63 are manipulated by knobs 65 which thread onto the bolts. There is a plate 66, that is provided with a knife edge, secured to the plate 62 by screws 67. There is a plate 68 (Figs. 1 and 2) secured to the gage bar 60 by screws 69. This plate 68 is also provided with a knife edge. Two knife-edge plates 66 and 68 rest with their knife edges on the tops of diametrically opposite blades 21 of the cutter to be tested.

The gage bar 60 is held in erect position and against tilting over by clamping plates 70 and 71 (Figs. 7 and 1). The clamping plate 70 is secured to the supporting bar 42 by screws 72. The clamping plate 71 is secured to the supporting bar 55 by screws 73. The position of the gage bar 60 crosswise of the cutter can be adjusted precisely by rotating the shaft 75 (Fig. 7). This shaft is journaled in the supporting bar 42 and it has a cylindrical projection 76 at its front end which is formed eccentrically of the axis of the shaft. The projection 76 is adapted to engage a hardened plate 77 which is secured to the gage bar 60. The shaft 75 can be rotated by a handle 78 which has a knurled knob 79 at its rear end and which is pinned to the shaft 75. As will be obvious, when the shaft 75 is rotated, the knife-edged plates 66 and 68 slide easily over the tips of the blades of the cutter to be tested, causing the gage bar 60 to be adjusted laterally on the cutter.

The plate 62 has an enlarged guide portion 82 which is formed on its front face with a T-slot 83. A block 80 is adjustable on the guide portion 82 of the plate 62 and is provided with a tongue 84 (Figs. 2 and 4) which engages in the T-slot 83 to guide the block in its adjustment. The block is secured in any adjusted position on the guide portion 82 by a T-bolt 85 which engages in the T-slot 83 and which is manipulated by the knurled knob 86.

Pivotally mounted at one end in the block 80 is a rod 90. This rod has a pin 91 secured to it which is journaled in suitable bearings 92 and 93 provided in the block 80. The pin 91 serves not only as a pivot for the rod but also as a means for fastening a wormwheel segment 94 to the rod. The worm wheel segment meshes with a worm 95 that is secured to a shaft 96. The shaft 96 is journaled in any suitable manner in the block 80 and is pinned to a handle 97 which has a knurled knob 98 formed on its upper end so that it may be rotated readily. Handle 97 and knurled knob 98 serve as a means for adjusting the rod 90 about its pivot 91.

At the end opposite the pivot 91, the rod 90 is slidably adjustable in a guide member 100 (Figs. 2, 4 and 6). The rod is graduated and its graduations read against a vernier provided on the front of guide member 100. After adjustment, the rod 90 is secured to the block 100 by a set screw 106 or any suitable clamping means. The guide member 100 is fastened in any suitable manner to a block 101 that is pivoted by means of pin 102 on a bar 103. The block 101 is bifurcated to straddle the bar 103 and the pin 102 passes through the bar 103 and is journaled in suitable bearings 104 and 105 in the furcations of block 101. The bar 103 is mounted in a casting 110 for movement therein in the direction of the axis of the spindle 11. It is slabbed off on opposite sides to accommodate the furcations of block 101 but otherwise is of cylindrical shape and slides in bearings 111 and 112 which are secured in the casting 110. It has a graduated plate 113 secured to its upper end which reads against the graduations on a plate 114. The plate 114 is secured to a housing 115 which encloses the casting 110 and which is secured to the gage bar 60 in any suitable manner.

The casting 110 is mounted to slide in the housing 115 in a direction at right angles to the direction of movement of the bar 103 in the casting 110. For guiding the casting 110 in its movement, there are a plate 117 and a rod 122 (Fig. 6). The plate 117 is secured in any suitable manner to the casting and is formed with an upturned tongue 118 which engages in a slot 119 (Fig. 2) formed in a guide 120 which is secured in any suitable manner to the housing 115. The rod 122 has a pressed fit in the casting 110 (Fig. 3) and slides in suitable bearings 123 and 124 formed in the housing 115. A plug 125, which threads into the housing 115, serves to protect the bearing 123 from entry of grit or dust therein.

Mounted within an opening formed in the bar 103 is a flexible strap 130 (Figs. 2 and 6). This strap is secured to the bar 103 by a pin 131. The flexible strap has an enlarged head at its lower end which has a hole drilled through it in which is mounted a contact member 132. The bar 103 is formed at its lower end with an enlarged head which is bored to receive the supporting collar 134. This collar has a hole in it to receive the stem portion 133 of a conventional dial gage 135. The contact finger 136 of this gage engages one end of the contact member 132. The opposite end of the contact member 132 is intended to engage with the outside surface of a blade of the cutter to be tested.

The testing device may be built, for instance, to test all cutters of 6", 9" and 12" diameter. For testing the different diameters of cutters, gage bars 60 of different lengths may be employed. For testing a cutting of a given diameter, the cutter is mounted on a spindle 11 and the supporting arms 42 and 55 are adjusted on the arms 40 and 41 in accordance with the diameter of the cutter to be tested. Then a gage bar 60 of the desired length is placed on the supporting bars 42 and 55 so that knife edges of the plates 66 and 68 rest on the tips of the blades of the cutter. The block 80 is then adjusted on the guide 82 in accordance with the pressure angle or inclination to the axis of the cutter of the side surfaces of the blades to be tested. This adjustment may be made precisely by the use of Johansson blocks or other suitable gauging means placed between the button 137 (Fig. 2) and the knife-edge of the bar 66. The button 137 is integral with block 80 and its tip is, of course, therefore at a given distance from the axis of pivot 91. Adjustment of the block 80 on guide 82 permits therefore of positioning the axis of pivot 91 at a predetermined required distance from the tip of the knife-edge plates 66 and 68. When this adjustment for pressure angle has been made, the block 80 is clamped to guide 82 by T-bolt 85. The rod 90 is then adjusted in the guide 100 in accordance with the radius of curvature which the blades, that are to be tested, should have. The rod 90 may be graduated so as to read this radius direct. During this adjustment, T-bolts 63 (Fig. 3) are loosened so that the plate 62 may be free to slide on the bar 60. When the adjustment has been made, the rod 90 is clamped to guide 100 by tightening up set-screw 106. The plate 62 is then reclamped to the bar 60 by T-bolts 63 with the rod 103 and casting 110 at one extreme of their respective movements, preferably with the rod 103 in its uppermost position and the casting 110 all the way over to the right. The bar 60 is then adjusted precisely with reference to the supporting bars 42 and 55, by rotation of the handle 78 and eccentric projection 76, so as to bring the contact member 132 into engagement with a blade of the cutter to be tested. Then the dial gauge 135 may be set to zero. The device is now ready for use.

The operator then rotates the handle 97 to rock the rod 90 about its pivot 91, causing the rod 103 to be moved axially in the casting 110 and the casting 110 to be moved laterally in the housing 115. Thus, the contact member 132 will be moved in a circular path along the height of a blade being tested. If the curvature of the blade surface is correct, there will be no relative movement between contact member 132 and the contact finger 136 of the dial gage and the gage will continue to read zero as the contact member 132 moves from top to bottom of the blade. If the curvature of the blade surface is incorrect, however, or if the blade surface has an incorrect inclination to the axis of the cutter, then the contact member will move relative to rod 103, moving the flexible strap 130 and actuating the dial gage to register the inaccuracy. By reading the scale 114, the shape of the profile at any point down from the tip of the blade can be determined. The contact member is shown in full lines in Fig. 2 engaging a blade of the cutter at its tip and in dotted lines in the position which it will have assumed when it has been moved to the bottom of the profile of the blade.

For testing the radial positions of the different blades of the cutters, the contact member may be set at any position along the height of a blade and a reading taken on the dial gage, and then the cutter may be rotated to bring successive blades into position and successive readings taken at this same height down from their tips to see whether the blades are all at the same radial distance from the axis of the cutter head.

For rotating the cutter to bring successive blades into gaging position, there is a shaft 140 (Fig. 8) journaled in the base 10. There is a bevel pinion 141 integral with this shaft and this bevel pinion meshes with the bevel gear 142 which is secured by screws 143 (Fig. 1) to a plate 144 which is fastened in any suitable manner to the under face of the seat portion 13 of the spindle 11. The shaft 140 may be revolved by a hand crank 146 which is keyed to the shaft. To hold the spindle 11 against rotation during bolting of a cutter to the spindle or unbolting it, the shaft 140 may be locked against rotation. This may be done by manipulating the hand lever 147 which is keyed to a shaft 148 that threads into a nut 149 which is secured in the base 10. The inner end of the shaft 148 bears against a block 150 which contacts the periphery of the shaft 140. Hence, when the shaft 148 is moved inwardly, the block 150 is forced against the shaft 140 to prevent rotation of the shaft and of the cutter spindle.

While the testing device of the present invention has been illustrated in connection with a stand on which the cutter, that is to be tested, is mounted for testing, it is not restricted to such use. Cutters can be tested, for instance, on the machines on which the blades are relief-ground, by applying the gage bar 60 and the parts carried thereby directly to the cutter while the cutter is mounted on the relieving-grinder. In this way the progress and accuracy of the grinding of the blades can be determined during the grinding operation and before the cutter is taken off the relieving machine. For such a test, the knife edge plates 66 and 68 rest on the tips of the cutter blades and the knob 97 is rotated exactly in the same manner as already described. Some means should be provided on the machine, however, equivalent to the keepers 70 and 71, to hold the gage bar against tilting during the test.

While the device has been described in connection with the testing of a cutter having all outside blades, it will be understood that it is not restricted to such use, but may be employed for testing cutters having both inside and outside blades, and also for testing cutters having all inside blades. For testing inside blades, the rod 103 may be rotated through 180° to bring the contact member 132 into engagement with the inside surface of a blade of the cutter, and, of course, the rod 90 and block 80 require suitable adjustment.

In general it may be said that while a particular embodiment of the invention has been described, it will be understood that the invention is capable of other modifications, and the present application is intended to cover any variations, uses or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In apparatus for testing face-mill gear cutters, a bar adapted to rest on the tips of two diametrically opposite blades of a cutter to be tested, a supporting part mounted on said bar for movement in a curved path in a plane radial of the cutter axis, a contact member mounted on said supporting part but movable relative thereto in a direction transverse to the cutter axis, means for resiliently holding the contact member in engagement with a side surface of a blade to be tested, means for moving the supporting part to move the contact member along the height of a blade of the cutter, and means operatively connected to the contact member to indicate any movement of the contact member relative to the supporting part during movement of the contact member along the height of a cutter blade.

2. In apparatus for testing face-mill gear cutters, a bar, a supporting part mounted on said bar for movement in two directions at right angles to one another, one being parallel to the axis of the cutter to be tested and the other being at right angles thereto, a contact member mounted on said supporting part for movement relative thereto, means resiliently urging the contact member in one direction to hold it in engagement with a blade of the cutter to be tested during movement of the supporting part, means for moving the supporting part simultaneously in both directions of its movement to cause the contact member to follow a curved path and move along the height of a blade of the cutter and means for indicating any movement of the contact member relative to the supporting part during movement of the contact member over the height of a cutter blade.

3. In apparatus for testing face-mill gear cutters, a bar, a supporting part mounted on the bar for movement in two directions at right angles to one another, one being parallel to the axis of the cutter and the other being at right angles thereto, a contact member mounted on said supporting part for movement relative thereto, means resiliently urging the contact member in one direction to hold it in engagement with a blade of the cutter to be tested during movement of the supporting part, means for indicating any movement of the contact member relative to the supporting part, and means for moving the supporting part simultaneously in both directions of its movement to cause the contact member to follow a curved path along the height of a blade of the cutter, comprising an arm pivotally connected to the bar at one end and operatively connected to the supporting part at its other end.

4. In apparatus for testing face-mill gear cutters, a bar adapted to rest on the tops of blades of the cutter to be tested, a carrier mounted on said bar for rectilinear movement in a direction at right angles to the axis of the cutter, a rod mounted on the carrier for rectilinear movement in the direction of the axis of the cutter, a contact member mounted on said rod for movement relative thereto and adapted to engage a side of a blade of the cutter, means resiliently holding the contact member in engagement with the blade, means for indicating any movement of the contact member relative to the rod, means for moving the contact member to pass it along the height of a blade from top to bottom thereof, said means comprising an arm pivotally mounted at one end on the bar and pivotally connected at its opposite end to the rod, and means for rocking said arm about its pivot.

5. In apparatus for testing face-mill gear cutters, a bar adapted to rest on the tops of blades of the cutter to be tested, a carrier mounted on said bar for rectilinear movement in a direction at right angles to the axis of the cutter, a rod mounted on said carrier for rectilinear movement in the direction of the axis of the cutter, a contact member mounted on said rod for movement relative thereto and adapted to engage a side of a blade of the cutter, means resiliently holding the contact member in engagement with the blade, means for indicating any movement of the contact member relative to the rod, means for moving the contact member to pass it along the height of a blade from top to bottom thereof, said means comprising an arm pivotally mounted at one end on the bar and pivotally connected at its opposite end to the rod, means for rocking said arm about its first named pivot, and means for adjusting the position of said first-named pivot axially of the cutter.

6. In apparatus for testing face-mill gear cutters, a base, a cutter support rotatably mounted on the base and adapted to carry a cutter to be tested, a pair of arms extending from opposite sides of the base, supporting bars mounted on said arms for adjustment toward and from one another, a gage bar adapted to rest on the tips of blades of the cutter, means carried by the supporting bar for holding said gage bar in an erect position, means carried by one of said supporting bars and adapted to engage the gage bar to adjust the gage bar laterally on the supporting bars, a block mounted on the gage bar for adjustment axially of the cutter, a carrier mounted on the gage bar for rectilinear movement in a direction at right angles to the axis of the cutter, a rod mounted on the carrier for movement axially of the cutter, an arm pivotally connected at one end to the block and at its opposite end to the rod, a contact member mounted on the rod, means for resiliently holding the contact member in engagement with a blade of the cutter to be tested, means for indicating any movement of the contact member relative to the rod, and means for rocking said last named arm to move the contact member along the height of the cutter blade.

7. An apparatus for testing face-mill gear cutters, a bar adapted to rest on the tips of two diametrically opposite blades of the cutter to be tested, a block mounted on the bar for adjustment axially of the cutter, a carrier mounted on the bar for rectilinear movement in a direction at right angles to the axis of the cutter, a rod mounted on the carrier for movement axially of the cutter, a guide member pivotally mounted on the rod, an arm pivotally mounted at one end on said block and slideably adjustable at its opposite end in said guide member, a contact member mounted on the rod for movement in a direction approximately at right angles to the axis of the cutter, means carried by the rod for resiliently holding the contact member in engagement with a side of a blade of the cutter, means for rocking said arm about its pivot to pass the contact member along the height of the side of a blade, and means for indicating any movement of the contact member relative to the rod during its passage along the height of the blade.

OLAF A. JOHNSON.